United States Patent
Yun

(10) Patent No.: US 12,062,370 B2
(45) Date of Patent: Aug. 13, 2024

(54) ELECTRONIC DEVICE AND METHOD FOR CONTROLLING THE ELECTRONIC DEVICE THEREOF

(71) Applicant: Samsung Electronics Co., Ltd., Suwon-si (KR)

(72) Inventor: Jeonghyun Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 192 days.

(21) Appl. No.: 17/248,616

(22) Filed: Jan. 29, 2021

(65) Prior Publication Data
US 2021/0241771 A1 Aug. 5, 2021

(30) Foreign Application Priority Data
Jan. 31, 2020 (KR) .......................... 10-2020-0012200

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/165* (2013.01); *G06F 40/279* (2020.01); *G06F 40/30* (2020.01);
(Continued)

(58) Field of Classification Search
CPC ..... G10L 15/22; G10L 15/16; G10L 15/1815; G10L 15/30; G10L 2015/088;
(Continued)

(56) References Cited

U.S. PATENT DOCUMENTS 10,347,243 B2 * 7/2019 Lee .......................... G10L 15/22
10,482,903 B2 11/2019 Tao et al.
(Continued)

FOREIGN PATENT DOCUMENTS

JP 6513749 B2 5/2019
KR 10-1944777 B1 2/2019
(Continued)

OTHER PUBLICATIONS

International Search Report dated May 11, 2021 in connection with International Patent Application No. PCT/KR2021/001189, 3 pages.
Searching Authority dated May 11, 2021 in connection with International Patent 4 pages.
(Continued)

*Primary Examiner* — Bhavesh M Mehta
*Assistant Examiner* — Darioush Agahi

(57) ABSTRACT

An electronic device and a method for controlling the electronic device are disclosed. The method includes receiving a trigger speech of a user, entering a speech recognition mode to recognize a speech command of the user in response, and transmitting information to enter the speech recognition mode to at least one external device located at home. Further, the method includes obtaining a first speech information corresponding to a speech uttered by a user from a microphone included in the electronic device and receiving at least one second speech information corresponding to a speech uttered by the user from the at least one external device; identifying a task corresponding to a speech uttered by the user and an external device to perform the task based on the first speech information and the at least one second speech information; and transmitting, to the identified external device, information about the task.

20 Claims, 11 Drawing Sheets

(51) Int. Cl.
  *G06F 40/279* (2020.01)
  *G06F 40/30* (2020.01)
  *G10L 15/08* (2006.01)
  *G10L 15/16* (2006.01)
  *G10L 15/18* (2013.01)
  *G10L 15/30* (2013.01)
(52) U.S. Cl.
  CPC .......... *G10L 15/16* (2013.01); *G10L 15/1815* (2013.01); *G10L 15/30* (2013.01); *G10L 2015/088* (2013.01); *G10L 2015/223* (2013.01)
(58) Field of Classification Search
  CPC . G10L 2015/223; G06F 3/165; G06F 40/279; G06F 40/30
  See application file for complete search history.

(56) References Cited

U.S. PATENT DOCUMENTS

| | | | |
|---|---|---|---|
| 10,685,652 B1* | 6/2020 | Cherukuri | G10L 25/51 |
| 2016/0104480 A1* | 4/2016 | Sharifi | G10L 17/22 704/254 |
| 2018/0247645 A1* | 8/2018 | Li | G10L 15/1815 |
| 2019/0051289 A1 | 2/2019 | Yoneda et al. | |
| 2019/0066672 A1 | 2/2019 | Wood et al. | |
| 2019/0130914 A1* | 5/2019 | Sharifi | G10L 15/285 |
| 2019/0172452 A1* | 6/2019 | Smith | G10L 15/30 |
| 2019/0173687 A1 | 6/2019 | MacKay et al. | |
| 2019/0287522 A1 | 9/2019 | Lambourne et al. | |
| 2019/0304450 A1* | 10/2019 | Kwon | G10L 15/26 |
| 2019/0385614 A1* | 12/2019 | Kim | G10L 15/32 |
| 2020/0035235 A1 | 1/2020 | Lee | |
| 2020/0074988 A1 | 3/2020 | Park et al. | |
| 2020/0302925 A1* | 9/2020 | Shah | G06F 3/167 |
| 2020/0349323 A1* | 11/2020 | Ko | G06V 30/40 |
| 2021/0050018 A1* | 2/2021 | Kim | G10L 15/183 |
| 2021/0104242 A1* | 4/2021 | Hashimoto | G10L 15/08 |
| 2021/0366506 A1* | 11/2021 | Han | G06N 20/10 |

FOREIGN PATENT DOCUMENTS

| | | |
|---|---|---|
| KR | 10-2019-0094307 A | 8/2019 |
| KR | 10-2019-0096861 A | 8/2019 |
| KR | 10-2044526 B1 | 11/2019 |

OTHER PUBLICATIONS

Written Opinion of the International Application No. PCT/KR2021/001189,.

* cited by examiner

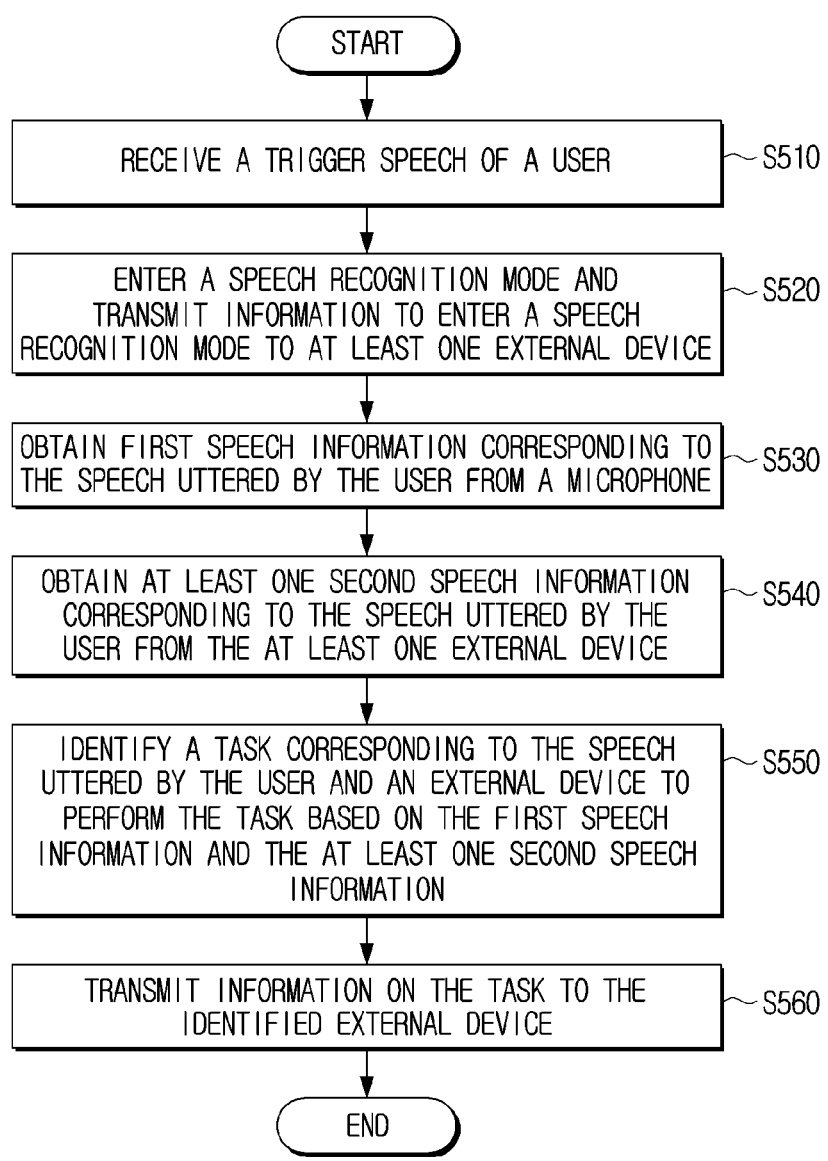

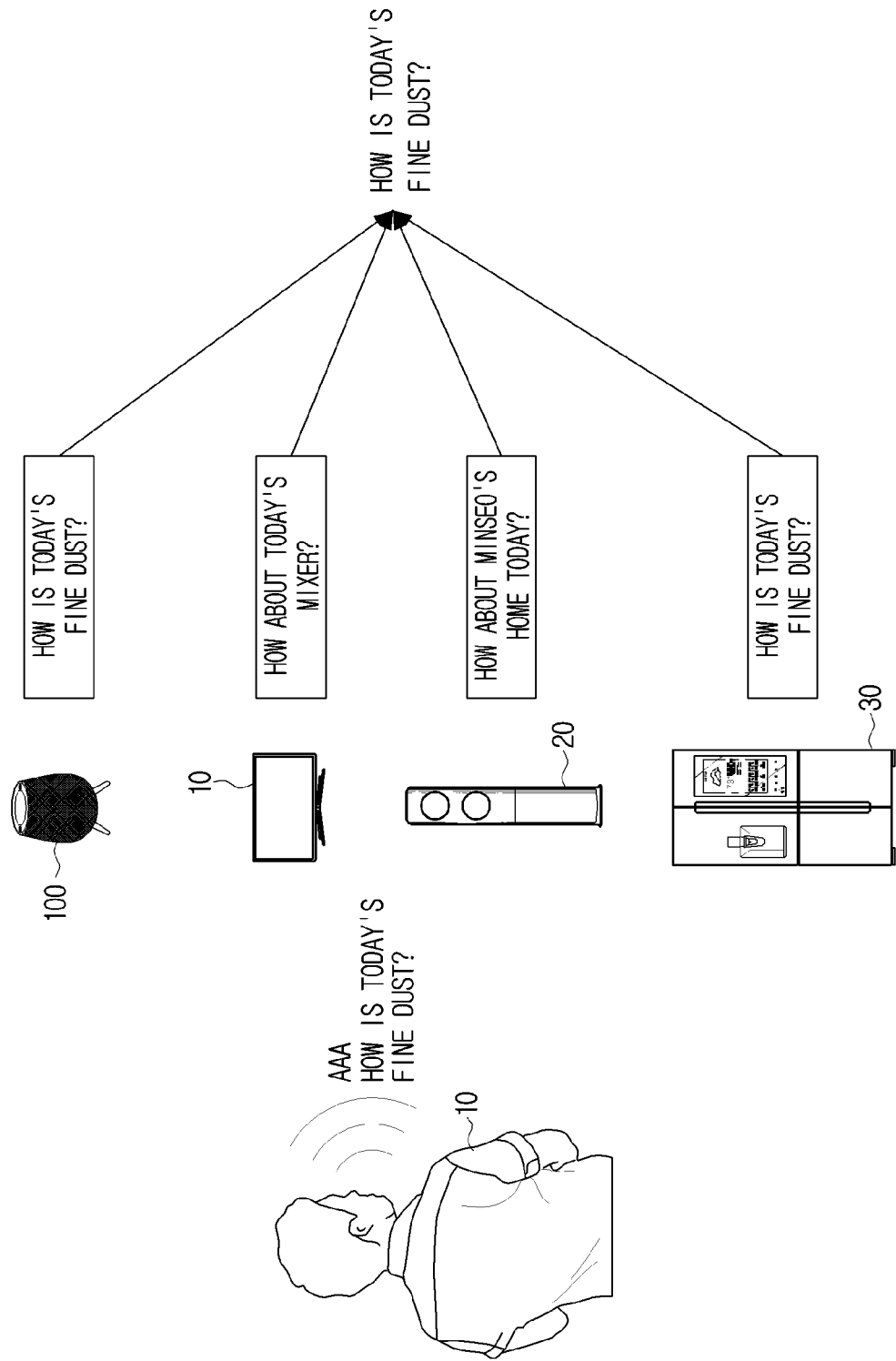

FIG. 7A

|  | "IU" | "SONG" | "PLEASE TURN" |
|---|---|---|---|
| REFRIGERATOR | X | X | △ |
| TV | ○ | △ | ○ |
| SPEAKER | ○ | ○ | ○ |

FIG. 7B

|  | "IU" | "MUSIC VIDEO" | "PLEASE TURN" |
|---|---|---|---|
| REFRIGERATOR | X | X | △ |
| TV | ○ | ○ | ○ |
| SPEAKER | ○ | △ | ○ |

FIG. 7C

|  | "BAEK, JONG-WON" | "RIPE KIMCHI" | "KIMCHI STEW" | "RECIPE" | "PLEASE LET ME KNOW" |
|---|---|---|---|---|---|
| REFRIGERATOR | ○ | ○ | ○ | ○ | △ |
| TV | ○ | X | X | X | △ |
| SPEAKER | △ | X | X | X | △ |

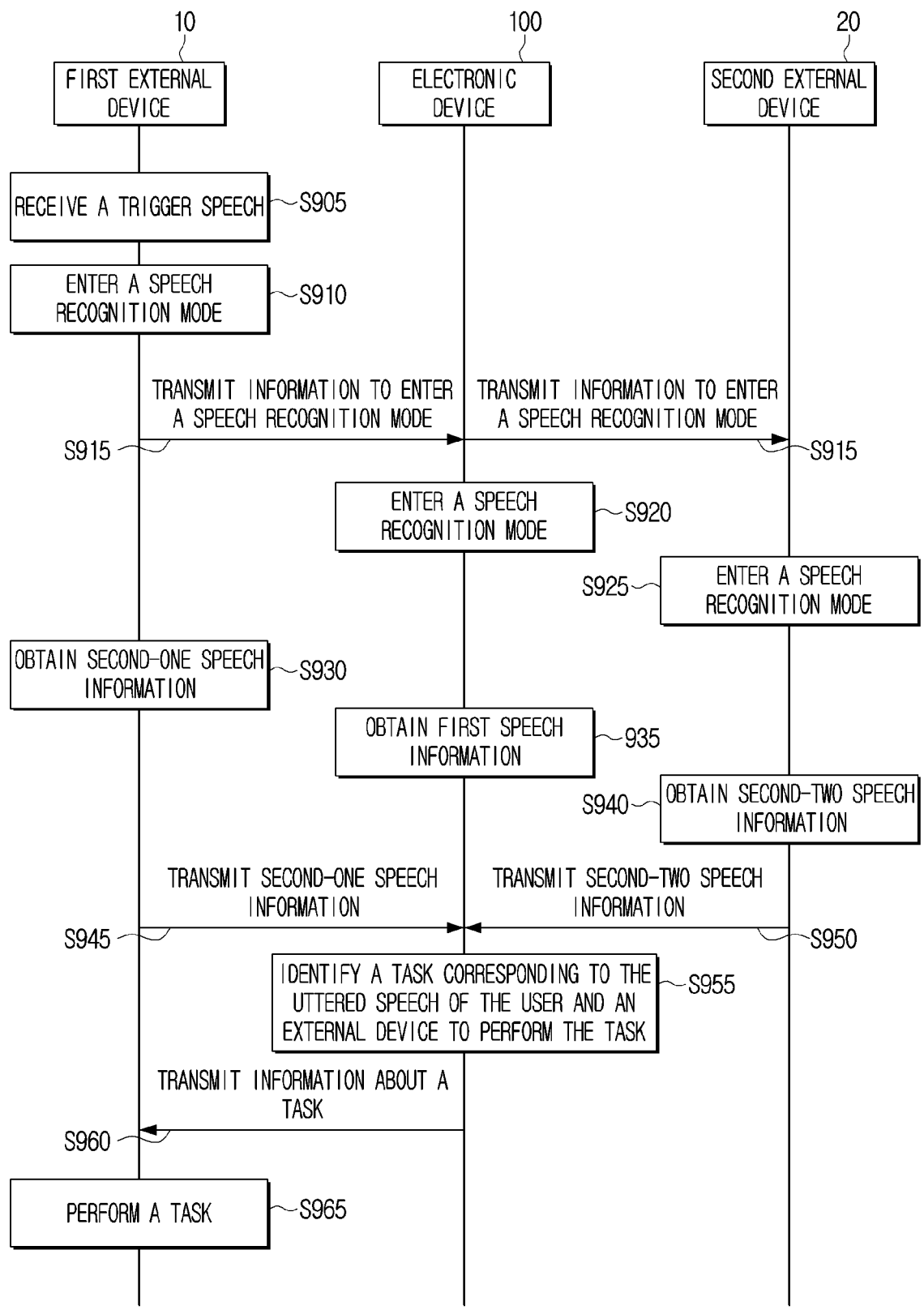

ELECTRONIC DEVICE AND METHOD FOR CONTROLLING THE ELECTRONIC DEVICE THEREOF

CROSS-REFERENCE TO RELATED APPLICATION

This application is based on and claims priority under 35 U.S.C. § 119 to Korean Patent Application No. 10-2020-0012200, filed on Jan. 31, 2020, in the Korean Intellectual Property Office, the disclosure of which is incorporated by reference herein in its entirety.

BACKGROUND

1. Field

This disclosure relates to an electronic device and a method for controlling thereof and, more particularly, to an electronic device which transmits information to enter a speech recognition mode to an external device, in response to a trigger speech of a user, and a method for controlling thereof.

2. Description of Related Art

In recent years, artificial intelligence (AI) systems have been used in various fields. An AI system is a system in which a machine learns, judges, and becomes smart, unlike an existing rule-based smart system. As the use of AI systems improves, a recognition rate and understanding or anticipation of a user's taste may be performed more accurately. As such, existing rule-based smart systems are gradually being replaced by deep learning-based AI systems.

An electronic device can perform various tasks using a user's speech. For example, an electronic device may perform a task of the electronic device corresponding to the speech of the user through the user's speech, or may perform a task for controlling the external device.

However, an electronic device may perform various operations through a user's speech. However, if there are a plurality of external devices capable of recognizing the user's speech at home, only the external device receiving a trigger speech for entering a speech recognition mode of a user may enter the speech recognition mode, so that a recognition rate is deteriorated. When the plurality of external devices located at home recognize a trigger speech of the user, there is a problem that an external device, which is not intended by the user, enters the speech recognition mode.

Even if the plurality of external devices at home recognize the trigger speech of the user, when there is a problem in that the recognition rate of an uttered speech of the user is deteriorated in the case of an external device in which a media is being played, or in the case of an external device remote from the user.

SUMMARY

Aspects of the disclosure are to address at least the above-mentioned problems and/or disadvantages and to provide at least the advantages described below. Accordingly, an aspect of the disclosure is to provide an electronic device which transmits information to enter a speech recognition mode to an external device, in response to a trigger speech of a user, and a method for controlling thereof.

According to an embodiment, a method of controlling an electronic device includes receiving a trigger speech of a user; entering a speech recognition mode to recognize a speech command of the user in response to the trigger speech, and transmitting information to enter the speech recognition mode to at least one external device located at home; obtaining first speech information corresponding to a speech uttered by a user from a microphone included in the electronic device while operating in the speech recognition mode and receiving(obtaining) at least one second speech information corresponding to a speech uttered by the user from the at least one external device; identifying a task corresponding to a speech uttered by the user and an external device to perform the task based on the first speech information and the at least one second speech information; and transmitting, to the identified external device, information about the task.

According to an embodiment, an electronic device includes a communication interface, an input interface, a memory storing at least one instruction, and a processor configured to control the electronic device by executing at least one instruction stored in the memory, and the processor is further configured to receive a trigger speech of a user through the input interface, enter a speech recognition mode to recognize the user's speech command in response to the trigger speech, and transmit information to enter a speech recognition mode to at least one external device located at home through the communication interface, obtain first speech information corresponding to a speech uttered by a user from a microphone included in the input interface while operating in a speech recognition mode and receive(obtain) at least one second speech information corresponding to a speech uttered by the user from the at least one external device through the communication interface, identify a task corresponding to a speech uttered by the user and an external device to perform the task based on the first speech information and the at least one second speech information; and transmit, to the identified external device, information about the task through the communication interface.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 illustrates a flowchart illustrating a controlling method of an electronic device according to an embodiment;

FIG. 6 illustrates a diagram illustrating a method for obtaining final text information corresponding to a user's utterance according to an embodiment;

FIG. 7A illustrates a diagram illustrating a method of identifying a device to perform a task based on final text information corresponding to a user's uttered speech according to an embodiment;

FIG. 7B illustrates a diagram illustrating a method of identifying a device to perform a task based on final text information corresponding to a user's uttered speech according to an embodiment;

FIG. 7C illustrates a diagram illustrating a method of identifying a device to perform a task based on final text information corresponding to a user's uttered speech according to an embodiment;

FIG. 9 illustrates a sequence diagram illustrating a task between an electronic device and a plurality of external devices according to an embodiment.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
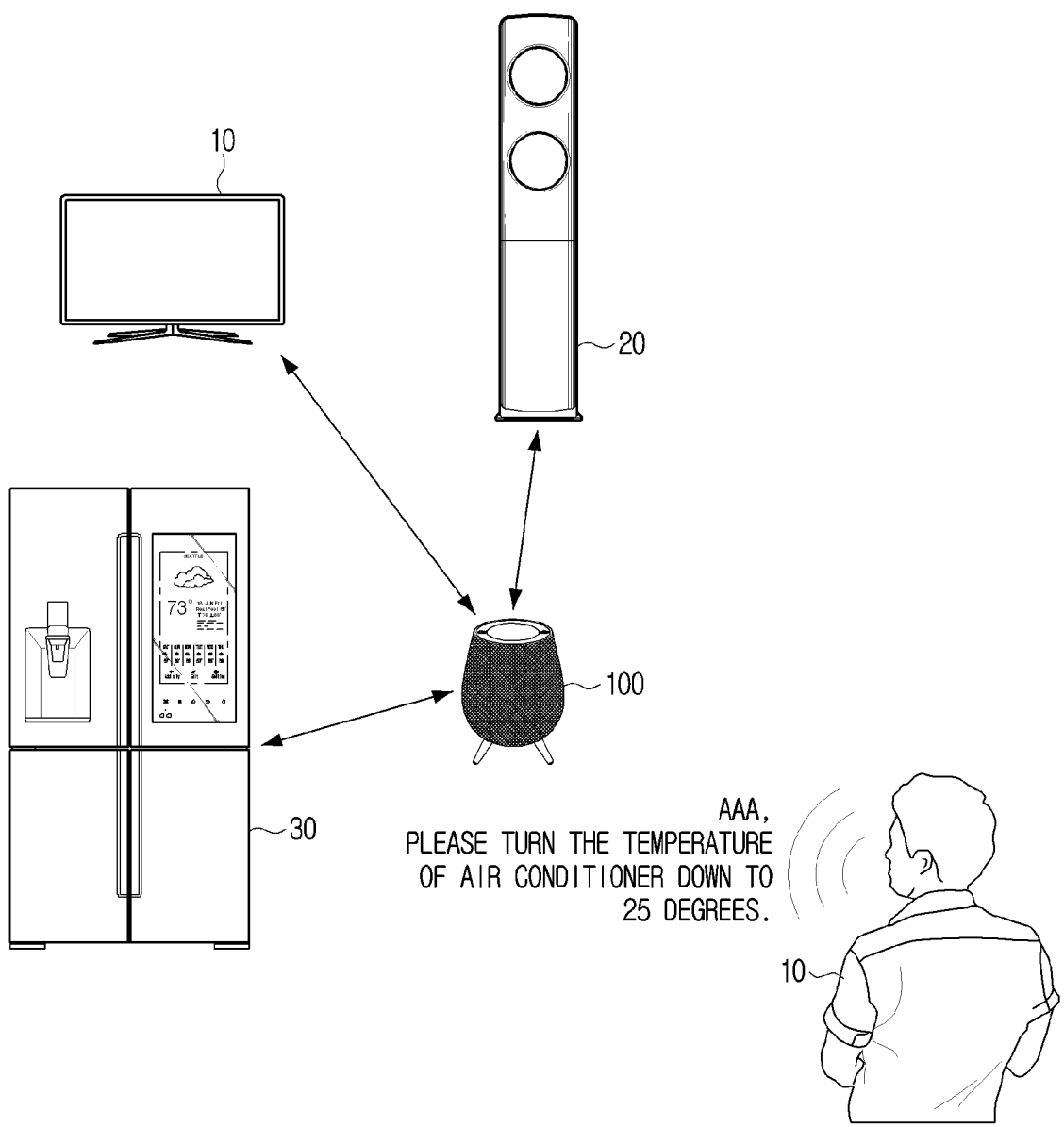
FIG. 1 illustrates a usage diagram of an electronic device performing a task in response to a user's speech according to an embodiment.

Hereinafter, embodiments of the disclosure will be described with reference to the accompanying drawings. FIG. 1 is a usage diagram of an electronic device performing a task in response to a user's speech according to an embodiment.

An electronic device 100 may receive a trigger speech for activating an artificial intelligence (AI) agent program. For example, a trigger word, such as "Bixby," "Hi, Bixby," or the like, can be included as a trigger speech, and FIG. 1 illustrates that the trigger speech is "AAA". In response to the trigger speech, the electronic device 100 may activate the AI agent program. The AI agent program may include a dialogue system which processes and provides a response to a user speech to a natural language, and may perform a task on the user's speech. In at least one embodiment, the electronic device 100 may select a specific button provided in the electronic device 100 in addition to a trigger word for activating the AI agent program, and then receive the user's speech. In at least one embodiment, when at least one external device located at home receives a trigger speech, the electronic device 100 may receive information to enter the speech recognition mode from an external device that received the trigger speech, and enter the speech recognition mode. According to an embodiment, the at least one external device and the electronic device 100 may have the same AI agent. That is, at least one external device located at home and the electronic device 100 may recognize the same trigger speech and enter the speech recognition mode.

When the trigger speech is received, the electronic device 100 may enter a speech recognition mode for recognizing a speech command of the user, and activate the artificial intelligence agent program. According to an embodiment, when a trigger speech is received, the electronic device 100 can transmit information for entering the speech recognition mode to at least one external device located at home. At least one external device located at home may receive information for entering a speech recognition mode from the electronic device 100 and enter a speech recognition mode. Through the above-described process, when at least one external device located at home receives a trigger speech, all external devices including the artificial intelligence agent program at home can enter the speech recognition mode.

When the AI agent program is activated and the electronic device 100 is operating in the speech recognition mode, the electronic device 100 can obtain first speech information corresponding to the speech uttered by the user. At this time, the speech uttered by the user may be speech for performing a specific task. For example, as illustrated in FIG. 1, the electronic device 100 may obtain first speech information corresponding to a user speech "please turn down the temperature of an air conditioner to 25 degrees."

The electronic device 100 can receive(obtain) at least one second speech information corresponding to a speech uttered by a user from at least one external device located at home. For example, referring to FIG. 1, after the user utters the trigger speech of "AAA", and utters "please turn the air conditioner down to 25 degrees," the first external device 10 may obtain second-one speech information corresponding to the user utterance, and a second external device 20 may obtain second-two speech information corresponding to the user utterance. A third external device 30 may obtain second-three speech information corresponding to the user utterance. That is, each of the external devices may receive a signal corresponding to the uttered speech of the user for the uttered speech of the same user, and each of the external devices may transmit speech information corresponding to the received signal to the electronic device 100.

According to one embodiment, the second-one to second-three speech information may be different from each other. That is, depending on the distance between the at least one external device and the user, the external environment, etc., the speech information received from each of the external devices may be different for the same user's utterance. For example, the first external device 10 may obtain second-one speech information corresponding to "please turn the air conditioner down to 15 degrees" by the audio output from the first external device 10 with respect to the user speech "please turn down the air conditioner to 25 degrees". The second external device 20 can obtain a second-two speech information corresponding to "15 degrees of air conditioner", since the second external device 20 is located far away from the user.

Based on obtaining the first speech information corresponding to the speech uttered by the user from the microphone included in the electronic device 100, and obtaining at least one second speech information from the at least one external device, the electronic device 100 can identify a task corresponding to the speech uttered by the user and an external device to perform the task, based on first speech information and at least one second speech information. Specifically, the electronic device 100 may input first speech information and at least one second speech information to an automatic speech recognition (ASR) module to obtain first text information corresponding to the first speech information and at least one second text information corresponding to the at least one second speech information. The electronic device 100 can obtain final text information corresponding to the speech uttered by the user based on the first text information and the at least one second text information. Referring to FIG. 1, the electronic device 100 may obtain text information corresponding to each speech information by inputting first speech information obtained from a microphone included in an electronic device, second-one speech information obtained from the first external device, and second-three speech information obtained from a third external device to the ASR module, and obtain final text information, for example, "please turn down the air conditioner to 25 degrees" through the obtained plurality of text information. However, the electronic device 100 may receive at least one text information corresponding to the speech information obtained by the corresponding external device from at least one external device, and obtain final text information through text information corresponding to the received plurality of text information and the first speech information.

The electronic device 100 may input final text information to a natural language understanding (NLU) module to obtain information on the task corresponding to the speech uttered by the user. The final text information may include at least one keyword, and the electronic device 100 can identify an external device to perform a task corresponding to the speech uttered by the user based on at least one keyword included in the final text information.

However, the embodiment is not limited thereto, and the final text information may include a plurality of keywords corresponding to each syllable of the speech uttered by the user. The electronic device 100 may identify an external device to perform a task corresponding to a speech uttered by a user based on a plurality of keywords. That is, in at least one embodiment, the electronic device 100 can identify an external device to perform a task corresponding to a speech uttered by a user using all syllables for the speech uttered by the user.

Referring to FIG. 1, the electronic device 100 can obtain information on the task of setting the temperature of the air conditioner to 25 degrees, and can identify the second external device 20, which is an air purifier, as an external device to perform the task. However, the embodiment is not limited thereto, and the electronic device 100 may also identify that the device for performing a task corresponding to the speech uttered by the user is the electronic device 100. A detailed description of a method for identifying an external device to perform a task corresponding to a speech uttered by a user and information on a task corresponding to the speech uttered by a user will be described in detail with reference to FIGS. 7A to 7C.

If a task corresponding to the speech uttered by a user and an external device to perform the task are identified, the electronic device 100 may transmit information on a task corresponding to a speech uttered by a user to the identified external device. The identified external device may perform a task corresponding to the speech uttered by the user. Referring to FIG. 1, the electronic device 100 may transmit information for setting the temperature to 25 degrees to the second external device 20, and the second external device 20 can set the temperature to 25 degrees.

According to an embodiment, when a trigger speech is received, the electronic device 100 may control all the external devices including an artificial intelligence agent program at home to enter the speech recognition mode, thereby preventing a problem that an external device not intended by a user from entering a speech recognition mode.

By generating final text information through speech information received from at least one external device, recognition rate for the user's uttered speech can be improved.

In the above-described embodiment, the AI agent system is stored in the electronic device 100 to determine whether the user's speech is the task requiring user confirmation, and generates a query, but this is merely one embodiment, and some of the tasks described above can be implemented by an external server. For example, the external server may obtain text for user speech or determine whether the user speech is a task requiring user confirmation or generate a query.

The electronic device 100 may use the AI agent to provide a response to the above-mentioned user inquiry. At this time, the AI agent is a dedicated program to provide AI-based services (for example, speech recognition services, secretarial services, translation services, search services, etc.) and may be executed by existing general-purpose processors (for example, CPUs) or separate AI-only processors (for example, GPUs). The AI agent may control a variety of modules (for example, dialogue systems) that will be described in further detail in this disclosure.

A predetermined user speech (for example, a "Bixby" or the like) is input or a button (for example, a button for executing the AI agent) provided in the electronic device 100 is pressed, the AI agent may be operating. The AI agent may analyze the speech uttered by the user to identify the task corresponding to the speech and a subject to perform the task.

The AI agent may operate if a predetermined trigger speech (for example, "Bixby" or the like) is input or a button (for example, a button for executing the AI agent) provided in the electronic device 100 is pressed. In addition, the AI agent may be in a pre-executed state before the predetermined trigger speech (for example, "Bixby" or the like) is input or a button (for example, a button for executing the AI agent) provided in the electronic device 100 is pressed. In this case, after the predetermined trigger speech (for example, "Bixby" or the like) is input, or a button (for example, a button for executing the AI agent) provided in the electronic device 100 is pressed, the AI agent of the electronic device 100 may perform a task for the user's speech. For example, when the AI agent is executed by an AI-dedicated processor, before a predetermined user speech (for example, "Bixby" or the like) is input or a button (for example, a button for executing the AI agent) provided in the electronic device 100 is pressed, a function of the electronic device 100 is executed by the general-purpose processor, and after the predetermined user speech (for example, "Bixby," or the like) is input or the button (a button for executing the AI agent) provided in the electronic device 100 is pressed, a function of the electronic device 100 may be executed by the AI-dedicated processor.

In addition, the AI agent may be in the standby state before a predetermined user speech (for example, "Bixby" or the like) is input or a button (a button for executing the AI agent) provided in the electronic device 100 is pressed. Here, the standby state that detects receiving a predefined user input to control the start of a task of the AI agent. When a preset user speech (for example, "Bixby" or the like) is input or a button (for example, a button for executing the AI agent) provided in the electronic device 100 is pressed, while the AI agent is in the standby state, the electronic device 100 may operate the AI agent and perform a task for the user's speech using the operated AI agent.

The AI agent may be in a terminated state before a predetermined user speech (for example, "Bixby," or the like) is input or a button (for example, a button for executing the AI agent) is pressed. While the AI agent is being terminated, when a predetermined user speech (for example, "Bixby" or the like) is input or a button (for example, a button for executing the AI agent) provided in the electronic device 100 is pressed, the electronic device 100 may execute the AI agent and perform a task for the user's speech using the executed AI agent.

In the meantime, the AI agent may control various devices or modules. This will be described in more detail below.

In addition, the specific examples for analyzing the user's speech using various models trained between the electronic device 100 and the server to determine whether the speech is user's speech related to a task requiring the user's confirmation, generate and provide a query based on the determination result will be described in further detail and with reference to various embodiments.

According to various embodiments, when a trigger speech is received, the electronic device can control all external devices located at home to enter a speech recognition mode, thereby preventing a problem in that only an external device not intended by a user from entering a speech recognition mode.

By generating final text information through speech information received from at least one external device, recognition rate for user's uttered speech can be improved.

Figure 2:
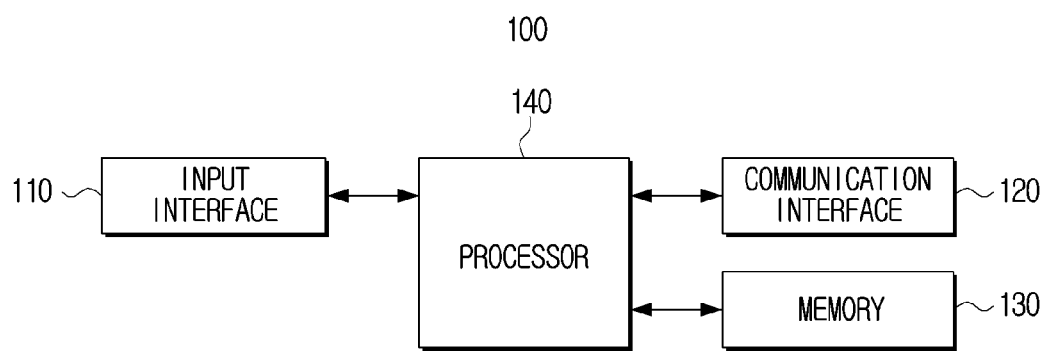
FIG. 2 illustrates a block diagram schematically illustrating a configuration of an electronic device according to an embodiment.

FIG. 2 illustrates a schematic block diagram of an electronic device according to an embodiment. As shown in FIG. 2, the electronic device 100 may include an input interface 110, a communication interface 120, a memory 130, and a processor 140. However, some configurations may be added or omitted depending on the type of the electronic device.

The input interface 110 may receive a user input for controlling the electronic device 100. For example, the input interface 110 may receive various user manipulations such as user touch, user's uttered speech, or the like, of a user for controlling the electronic device 100. In particular, the input interface 110 may receive a user's uttered speech for performing a task. In at least one embodiment, the input interface 110 may include a microphone, and the electronic device 100 may receive user's uttered speech through a microphone.

The communication interface 120 may communicate with an external electronic device. The communication interface 120 with an external device may include communication via a third device (for example, a repeater, a hub, an access point, a server, a gateway, or the like). Wireless communication may include cellular communication using any one or any combination of the following, for example, long-term evolution (LTE), LTE advanced (LTE-A), a code division multiple access (CDMA), a wideband CDMA (WCDMA), and a universal mobile telecommunications system (UMTS), a wireless broadband (WiBro), or a global system for mobile communications (GSM), and the like. According to an embodiment, the wireless communication may include, for example, any one or any combination of wireless fidelity (Wi-Fi), Bluetooth, Bluetooth low energy (BLE), Zigbee, near field communication (NFC), magnetic secure transmission, radio frequency (RF), or body area network (BAN). Wired communication may include, for example, a universal serial bus (USB), a high definition multimedia interface (HDMI), a recommended standard 232 (RS-232), a power line communication, or a plain old telephone service (POTS). The network over which the wireless or wired communication is performed may include any one or any combination of a telecommunications network, for example, a computer network (for example, local area network (LAN) or wide area network (WAN)), the Internet, or a telephone network.

The communication interface 120 may communicate with an external server to provide an AI agent service. In particular, the communication interface 120 may transmit speech information corresponding to the user's uttered speech to the external server, and may receive information on the task corresponding to the user's uttered speech and a device to perform the task from the external server.

The memory 130 may store instructions or data related to at least one another element of the electronic device 100. The memory 130 may be implemented as a non-volatile memory, a volatile memory, a flash memory, a hard disk drive (HDD), a solid-state drive (SSD), or the like. The memory 130 is accessed by the processor 140 and reading/writing/modifying/deleting/updating of data by the processor 140 may be performed. In the disclosure, the term memory may include the memory 130, read-only memory (ROM) in the processor 140, RAM, or a memory card (for example, a micro secure digital (SD) card, and a memory stick) mounted to the electronic device 100. In addition, the memory 130 may store programs and data for controlling various screens to be displayed in the display area of the display of the electronic device 100.

In addition, the memory 130 may store an AI agent for operating the dialogue system. Specifically, the electronic device 100 may use an AI agent to generate a natural language in response to user's utterance. At this time, the AI agent is a dedicated program for providing an AI-based service (e.g., a speech recognition service, a secretary service, a translation service, a search service, etc.). In particular, the AI agent may be executed by an existing general-purpose processor (e.g., a central processing unit (CPU)) or a separate AI-only processor (e.g., a graphics processing unit (GPU), etc.).

Figure 4:
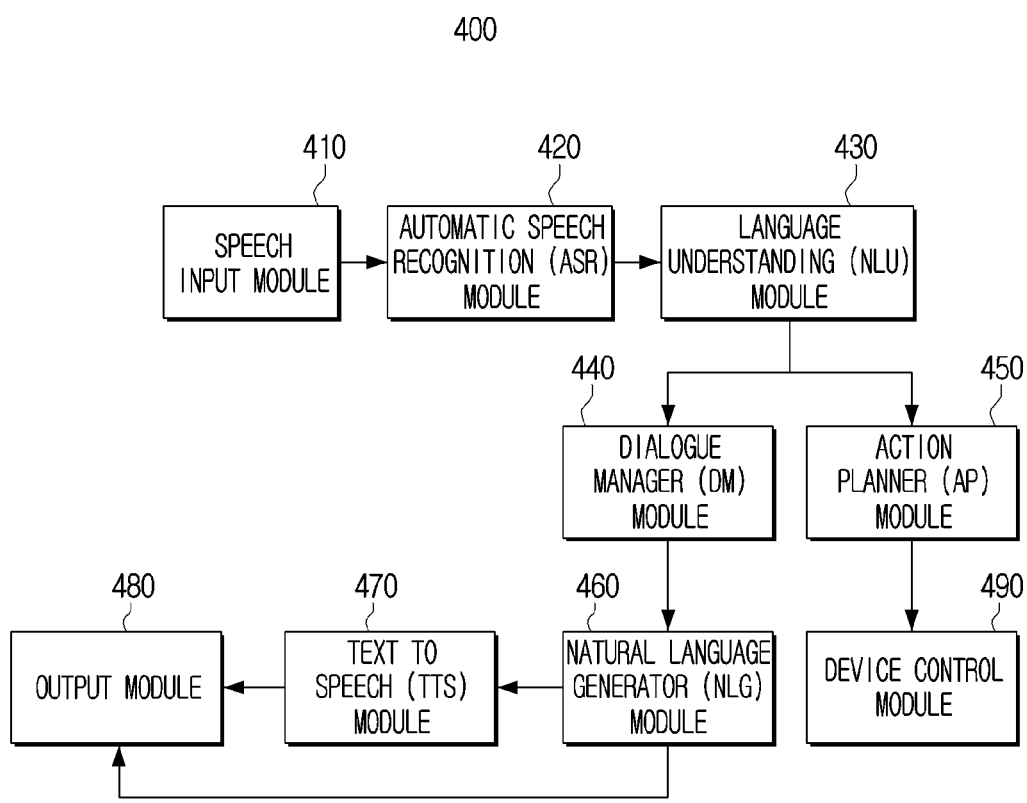
FIG. 4 illustrates a block diagram illustrating a dialogue system of an artificial intelligence agent system according to an embodiment.

The memory 130 may include a plurality of configurations (or modules) forming a dialogue system as illustrated in FIG. 4. This will be described in greater detail with reference to FIG. 4.

The processor 140 may be electrically connected to the memory 130 to control the overall operation and function of the electronic device 100. In particular, the processor 140 may receive the user's trigger speech through the input interface 110, by executing at least one instruction stored in the memory 130. However, the embodiment is not limited thereto, and may receive information for entering a speech recognition mode from an external device located at home through the communication interface 120.

When the information for entering the trigger speech or speech recognition mode is received, the processor 140 may enter a speech recognition mode for recognizing the speech command and activate the AI agent. The processor 140 may transmit information for entering the speech recognition mode to at least one external device located at home. According to an embodiment, the processor 140 may transmit information for entering a speech mute mode to at least one external device located at home, along with information for entering the speech recognition mode. In at least one embodiment, the processor 140 may transmit information for making an external device enter the mute mode along with information for entering the speech recognition mode to an external device in which an image or audio is being played, among at least one external device. Further, in at least one embodiment, the speech recognition engine included in the electronic device 100 and at least one external device may be the same. That is, the electronic device 100 and the at least one external device may include the same AI agent program.

While operating in the speech recognition mode, the processor 140 may obtain first speech information corresponding to the speech uttered by the user from the microphone included in the input interface 110, and obtain at least one second speech information corresponding to the speech uttered by the user from the at least one external device. According to one embodiment, the first speech information and the at least one second speech information may be speech information corresponding to the same user utterance, the first speech information may be speech information received by the electronic device 100 through the microphone, and the at least one second speech information may be speech information that the at least one external device may receive via a microphone of the external device. The first speech information and the at least one second speech information may be different depending on a location of the user and the external device and environment.

The processor 140 may identify a task corresponding to the speech uttered by the user and a device to perform the task based on the first speech information and the at least one second speech information. Specifically, the processor 140 may input the first speech information and the at least one second speech information to the ASR module to obtain first text information corresponding to the first speech information and at least one second text information corresponding to the at least one second speech information. The processor 140 may obtain final text information corresponding to the speech uttered by the user based on the first text information and the at least one second text information.

In at least one embodiment, if the first text information and the at least one second text information are the same, the processor 140 can identify the first text information as final text information. If at least two of the first text information and the at least one second text information are different from each other, the processor 140 may input the first text information and the at least one second text information to the artificial neural network model to obtain final text information. The artificial neural network model according to the disclosure may be a neural network model that receives a plurality of text information and generates final text information corresponding to the utterance of a user. The AI model may include a plurality of neural network layers. Each layer includes a plurality of weight values, and may perform a neural network processing operation through an iterative operation leveraging results of a previous layer and a plurality of weight values. Examples of a neural network may include a convolutional neural network (CNN), a deep neural network (DNN), a recurrent neural network (RNN), a restricted Boltzmann machine (RBM), a deep belief network (DBN), bidirectional recurrent deep neural network (BRDNN), a deep Q-network, or the like, but the neural network is not limited thereto unless otherwise specified.

In at least one embodiment, the artificial neural network model according to the disclosure can obtain final text information corresponding to a plurality of text information based on an instruction history of a user, a duplicated word included in a plurality of inputted text information, and a similarity between a plurality of text information.

In at least one embodiment, the processor 140 may obtain a list of instructions that the user has uttered. The list of instructions uttered by the user may include information about 100 commands that the user has frequently uttered. If the first text information and the at least one second text information are different, the artificial neural network model may identify the similarity between the first text information and the at least one second text information with each of the plurality of instructions included in the instruction list. Based on the identified similarity, the processor 140 can identify text information having the highest similarity among the first text information and the at least one second text information as final text information. The processor 140 may input the final text information to the natural language understanding module (NLU) module to obtain information on the task corresponding to the speech uttered by the user. In at least one embodiment, specifically, the processor 140 may input the final text information to the natural language understanding module (NLU) to obtain information about the user intent and slot for the final text information corresponding to the speech uttered by the user. A detailed description of the natural language understanding module NLU will be described in further detail and with reference to FIG. 4.

The final text information may include at least one keyword, and the processor 140 can identify an external device to perform a task corresponding to the speech uttered by the user based on at least one keyword included in the final text information. In at least one embodiment, the processor 140 may identify an external device to perform a task through a weight assigned to each of the at least one keyword included in the final text information.

The final text information may include a plurality of keywords corresponding to each syllable of the speech uttered by the user, and the processor 140 can identify an external device to perform a task corresponding to the speech uttered by the user based on a plurality of keywords included in the final text information. A detailed description of a method for identifying an external device to perform a task corresponding to a speech uttered by a user and a task corresponding to a speech uttered by a user will be described in detail with reference to FIGS. 7A to 7C.

If an external device to perform a task and a task corresponding to a speech uttered by a user is identified, the processor 140 may transmit information on a task corresponding to the speech uttered by the user to the identified external device. The identified external device may perform a task corresponding to the speech uttered by the user.

Figure 3:
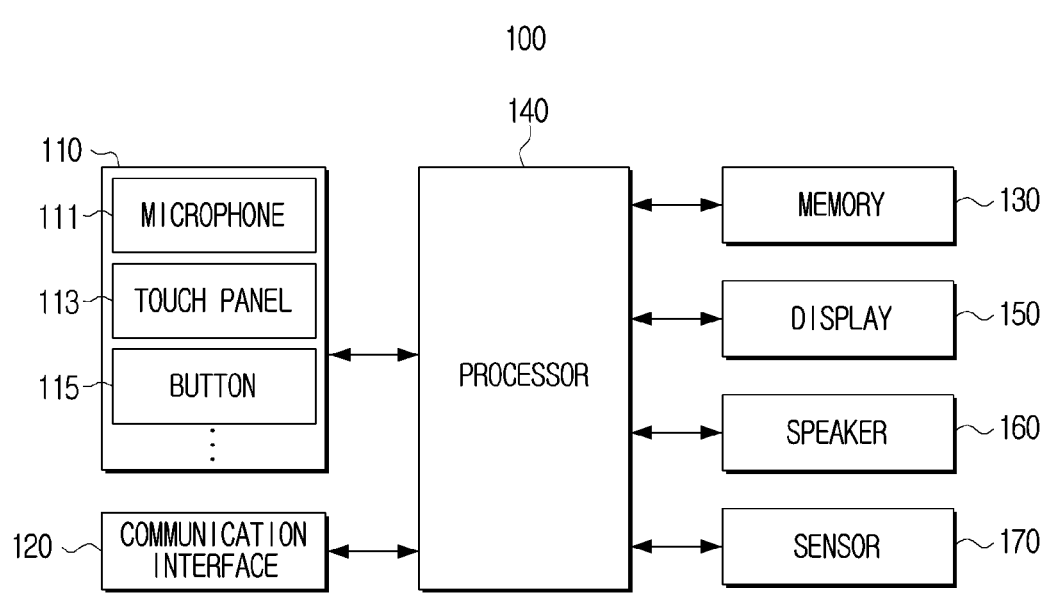
FIG. 3 illustrates a block diagram illustrating a configuration of an electronic device in detail according to an embodiment.

FIG. 3 illustrates a block diagram illustrating a configuration of an electronic device, according to embodiments. As illustrated in FIG. 3, the electronic device 100 may include the input interface 110, the communication interface 120, a memory 130, a display 150, a speaker 160, a sensor 170, and the processor 140. The input interface 110, the communication interface 120, the memory 130, and the processor 140 in FIG. 3 have been described in FIG. 2 and will not be described.

The input interface 110 may receive user input to control the electronic device 100. The input interface 110 may receive a user speech to perform a specific task. As illustrated in FIG. 3, the input interface 110 may include a microphone 111 for receiving an input of a user speech, a touch panel 113 for receiving a user touch using user hand or a stylus pen, and a button 115 for receiving a user manipulation, or the like. However, an example of the input interface 110 as illustrated in FIG. 3 is an example, and the input interface 110 may be implemented as other input devices (e.g., keyboard, mouse, motion inputter, or the like).

The display 150 may display various information under the control of the processor 140. In particular, the display 150 may display a user interface (UI) that includes a plurality of objects. The display 150 may display a message window that includes a dialogue between the user and the intelligent agent system. The display 150 may be implemented as a touch screen with the touch panel 113.

The speaker 160 is a configuration to output not only various audio data processed as decoding, amplification, and noise filtering but also various notification sounds or speech message. The speaker 160 may output a task or guide message to the speech uttered by the user as a speech message in a natural language format. The configuration to output audio may be implemented as a speaker, but this is an example and may be implemented as an output terminal for outputting audio data.

The sensor 170 may sense various status information of the electronic device 100. For example, the sensor 170 may include a motion sensor (e.g., a gyro sensor, an acceleration sensor, or the like) capable of sensing motion information of the electronic device 100, and may include a sensor for sensing position information (for example, a global positioning system (GPS) sensor), a sensor (for example, a temperature sensor, a humidity sensor, an air pressure sensor, and the like) capable of sensing environmental information around the electronic device 100, a sensor that can sense user information of the electronic device 100 (e.g., blood pressure sensors, blood glucose sensors, pulse rate sensors, etc.), and the like. In addition, the sensor 170 may further include an image sensor or the like for photographing the outside of the electronic device 100.

FIG. 4 illustrates a block diagram illustrating a dialogue system of an AI agent system, according to embodiments. A dialogue system 400 illustrated in FIG. 4 is a configuration for performing a dialogue via a natural language with a virtual AI agent, and according to embodiments, the dialogue system 400 may be stored inside the memory 130 of the electronic device 100. However, this is an example, and may be implemented in a form where hardware and software are combined, and at least one included in the dialogue system 400 may be included in at least one external server.

As illustrated in FIG. 4, the dialogue system 400 may further include a speech input module 410, an automatic speech recognition (ASR) module 420, a natural language understanding (NLU) module 430, a dialogue manager (DM) module 440, an action planner (AP) module 450, a natural language generator (NLG) module 460, and a text to speech (TTS) module 470, an output module 480, and a device control module 490.

The speech input module 410 may receive user's uttered speech in the form of speech data. At this time, the speech input module 410 may include a microphone, may receive an analog audio signal including a user's uttered speech through a microphone, and may convert the analog signal into a digital signal. In at least one embodiment, the speech input module 410 may remove the noise component from the digital signal to obtain speech information corresponding to the user's uttered speech. However, according to another embodiment, the speech input module 410 may not remove a separate noise component, and then the noise included in the digital signal can be removed through the speech recognition model. In particular, the user's uttered speech received through the speech input module 410 may be in the form of a sentence or a phrase that includes at least one text, but this is only one embodiment, and may include a plurality of sentences or phrases.

The microphone included in the speech input module 410 may be provided within the electronic device 100, but this is only one embodiment, and may be provided externally to be wired or wirelessly connected to the electronic device 100. In addition, the speech input module 410 may include a communication module for receiving user speech from an external device.

The ASR 420 may convert a user's uttered speech in a speech information format received from the speech input module 410 to the text information. The ASR module 420 may include an acoustic model and a language model. For example, the acoustic model may include information related to vocalization, and the language model may include information on unit phoneme information and a combination of unit phoneme information. Text information is data composed of a character code, and speech data may include frequency information with respect to user's uttered speech. The speech recognition module may convert the user utterance into text data using the information related to speech and information on the unit phoneme information. Information about the acoustic model and language model may be stored in, for example, an automatic speech recognition database (ASR DB). According to an embodiment, the automatic speech recognition module 420 may generate first text information corresponding to the first speech information, and second text information corresponding to at least one second speech information. The automatic speech recognition module 420 may include an AI neural network model for receiving first text information and at least one second text information and generating final text information.

The natural language understanding module (NLU) 430 may recognize the intention of a user and a domain of user's utterance by performing syntactic analysis or semantic analysis. Grammatical analysis may divide the user input in grammatical units (for example: words, phrases, morphemes, or the like), and grasp which grammatical elements the divided units have. The semantic analysis may be performed using semantic matching, rule matching, formula matching, or the like.

According to an embodiment, the final text information may be input to the natural language understanding module (NLU) 430, so that information about a task corresponding to the speech uttered by the user can be obtained. Specifically, the processor 140 may input the final text information to the natural language understanding module (NLU) 430 to obtain information about the user intent and slot for the final text information corresponding to the speech uttered by the user. In at least one embodiment, information about a task corresponding to a speech uttered by a user may include information on an intent and a slot of a user.

The dialogue manager module 440 may provide a response to the user's uttered speech based on information about the user intent and slot included in the final text information obtained through the natural language understanding module 430. At this time, the dialogue manager module 440 may provide a response to the user's uttered speech based on the knowledge base. Here, the knowledge base can be included in the electronic device 100, but this is only one embodiment, and can be included in an external server. The dialogue manager module 440 may obtain information on the task corresponding to the speech uttered by the user based on the final text information.

The natural language generation module (NLG module) 460 may change the information about a task corresponding to the user's utterance obtained by the dialogue manager module 440 into a text form. The information changed in the text form may be a form of natural language utterance. The information about the task corresponding to the user's utterance may be, for example, information about an additional input, information for guiding completion of a task corresponding to a user input, or information for guiding an additional input of a user or information about a response to an inquiry (for example: feedback information for a user input). The information changed in the text form may be displayed on a display of the electronic device 100 or changed into a speech form by a text-to-speech (TTS) module 470.

The TTS module 470 may change the information of the text format to speech format information. The TTS module 470 may receive information of a text format from the natural language generation module 460, change the information of the text format into information of a speech data format.

The output module 480 may output information in the form of speech data received from the TTS module 470. The output module 480 may output information in the form of speech data through a speaker or a speech output terminal The output module 480 may output information in the form of text data obtained through the natural language generation module 460 through a display or an image output terminal.

The action planner module 450 may generate at least one action rule (or path rule) using information about the user intent and the slot. For example, the action planner module 450 can determine an application to be executed and a task to be executed in the application based on information about the user intent and the slot to generate at least one action rule. The action planner module 450 can identify an external device to perform a task based on an application to be executed and a task to be executed. In at least one embodiment, the action planner module 450 can identify at least one keyword included in the final text information based on a user's intent and a slot included in the final text information, and identify an external device to perform a task through a weight assigned to each of the identified keywords. Further, in at least one embodiment, the action planner module 450 can identify a plurality of keywords corresponding to each syllable of the speech uttered by a user included in the final text information on the basis of the user's intent and the slot included in the final text information, and identify an external device to perform a task through a weight assigned to each of the identified plurality of keywords. A method in which an external device to perform a task is determined based on at least one keyword included in the final text information will be described in further detail and with reference to FIGS. 7A to 7C.

The device control module 490 may control the electronic device 100 according to at least one action rule generated by the action planner module 450. For example, if the external device to perform the task identified in the action planner module 450 is the electronic device 100, the device control module 490 may control the electronic device 100 to perform a function according to the identified task. If the external device to perform the task identified in the action planner module 450 is an external device located at home, the device control module 490 may control the electronic device 100 to transmit information about the task to the external device.

FIG. 5 illustrates a flowchart illustrating a controlling method of an electronic device according to an embodiment.

Referring to FIG. 5, the electronic device 100 may receive a trigger speech of a user in operation S510. In at least one embodiment, the trigger speech may include a trigger word, such as "Bixby" and "Hi, Bixby", or the like, and in response to the trigger speech, the electronic device 100 may activate the AI agent program.

When the trigger speech is received, the electronic device 100 may enter a speech recognition mode and transmit information for entering the speech recognition mode to at least one external device in operation S520. Specifically, when the trigger speech is received, the electronic device 100 may enter a speech recognition mode for recognizing a speech command of the user, and activate the AI agent program. When the trigger speech is received, the electronic device 100 can transmit information for entering the speech recognition mode to at least one external device located at home. At least one external device located at home may receive information for entering a speech recognition mode from the electronic device 100 and enter a speech recognition mode. Accordingly, when at least one external device located at home receives the trigger speech, all external devices at home can enter the speech recognition mode.

While the AI agent program is activated and the electronic device 100 operates in the speech recognition mode, the electronic device 100 may obtain first speech information corresponding to the speech uttered by the user in operation S530.

In addition, the electronic device 100 may obtain at least one second speech information corresponding to the speech uttered by the user from the at least one external device in operation S540. In at least one embodiment, the at least one external device may be an external device located at home, such as the electronic device 100.

The electronic device 100 may identify a task corresponding to the speech uttered by the user and an external device to perform the task based on the first speech information and the at least one second speech information in operation S550. Specifically, the electronic device 100 may input first speech information and at least one second speech information to the ASR module to obtain first text information corresponding to the first speech information and at least one second text information corresponding to the at least one second speech information. The electronic device 100 can obtain final text information corresponding to the speech uttered by the user based on the first text information and the at least one second text information. The electronic device 100 may input final text information to the NLU module to obtain information on the task corresponding to the speech uttered by the user. Further, the final text information includes at least one keyword, and the electronic device 100 can identify an external device to perform a task corresponding to the speech uttered by the user based on at least one keyword included in the final text information.

If the task corresponding to a speech uttered by the user and an external device to perform the task are identified, the electronic device 100 may transmit information on the task corresponding to a speech uttered by the user to the identified external device in operation S560.

As described above, when the trigger speech is received, the electronic device 100 may control all external devices located at home to enter the speech recognition mode, thereby preventing a problem in that only an external device not intended by a user from entering a speech recognition mode.

By generating the final text information through the speech information from at least one external device, a recognition rate for the user's uttered speech can be improved.

FIG. 6 illustrates a diagram illustrating a method for obtaining final text information corresponding to a user's utterance according to an embodiment.

Referring to FIG. 6, after the user utters a trigger speech "AAA", the user may utter a speech "How is today's fine dust?". In addition, the electronic device 100 located at home may acquire first speech information corresponding to the user's utterance, and acquire first text information "how is today's fine dust?" through the first speech information. The first external device 10 located at home may obtain the second-one speech information corresponding to the user's speech, and may obtain the second-one text information "How about today's mixer?" through the second-one speech information. The second external device 20 located at home may obtain the second-two speech information corresponding to the user's utterance, and obtain the second-two text information of "How about Minseo's home today?" through the second-two speech information. Information can be obtained. The third external device 30 located at home may obtain the second-three speech information corresponding to the user's utterance, and may obtain the second-two text information "How is today's fine dust?" through the second-three speech information. In FIG. 6, it is illustrated that text information is obtained from each device, but the embodiment is not limited thereto, and the speech information received by each device is transmitted to the electronic device 100 and text information corresponding to a plurality of speech information received by the electronic device 100 can be generated.

The electronic device 100 may receive the second-one to second-three text information from a plurality of external devices 10, 20, and 30, and may identify the final text information corresponding to the speech uttered by the user as "how is today's fine dust?" based on the first text information and the second-one text information to second-three text information.

According to the embodiment above, the recognition rate for uttered speech the user can be improved by generating final text information through speech information received from a plurality of external devices.

FIG. 7A illustrates a diagram illustrating a method of identifying a device to perform a task based on final text information corresponding to a user's uttered speech according to an embodiment.

The electronic device 100 may identify an external device to perform a task corresponding to the user's uttered speech through at least one keyword included in the final text information corresponding to the user's uttered speech. Referring to FIG. 7A, if the final text information is a "please turn the song of IU," the electronic device 100 may identify three keywords of "IU," "song," "please turn" from the final text information, and may identify an external device related to each keyword. Referring to FIG. 7A, it may be identified that the keyword "IU" is a keyword associated with a singer and not relevant to a refrigerator (e.g., X), and may be identified as highly relevant with a TV and a speaker (e.g., 0). The "song" is a keyword associated with audio and may be identified as not relevant to the refrigerator (e.g., X), and may be identified as having a medium relevance with a (e.g., Delta A), and may be identified as being relevant with a speaker (e.g., O). The electronic device 100 may identify the speaker having the highest relevance with each keyword as an external device to perform a task corresponding to the user's uttered speech.

Referring to FIG. 7B, when the final text information is "please turn the music video of IU," a keyword for "music video" is different when compared with the final text information of FIG. 7A, and the electronic device 100 can identify a TV having a high relevance with the "music video" as an external device to perform a task corresponding to the user's uttered speech.

Referring to FIG. 7C, if the final text information is a "please let me know of a recipe of ripe Kimchi stew of Baek, Jong-won", the electronic device 100 may identify five keywords of "Baek, Jong-won," "ripe Kimchi," "Kimchi stew", "recipe" and "please let me know". The electronic device 100 may identify an external device to perform the task corresponding to the uttered speech of the user as the refrigerator based on the five keywords.

In FIGS. 7A to 7C, although an external device for performing a task corresponding to a speech uttered by a user is identified by using both keywords corresponding to each syllable of a speech uttered by a user corresponding to the final text information, an external device for performing a task corresponding to a speech uttered by a user can be identified through at least one of the keywords corresponding to each syllable of the speech uttered by a user corresponding to the final text information.

According to the above-described embodiment, the electronic device 100 may determine an external device to perform a task corresponding to a user's uttered speech of the plurality of external devices, thereby preventing the plurality of external devices at home from simultaneously responding to by the user's uttered speech.

Figure 8:
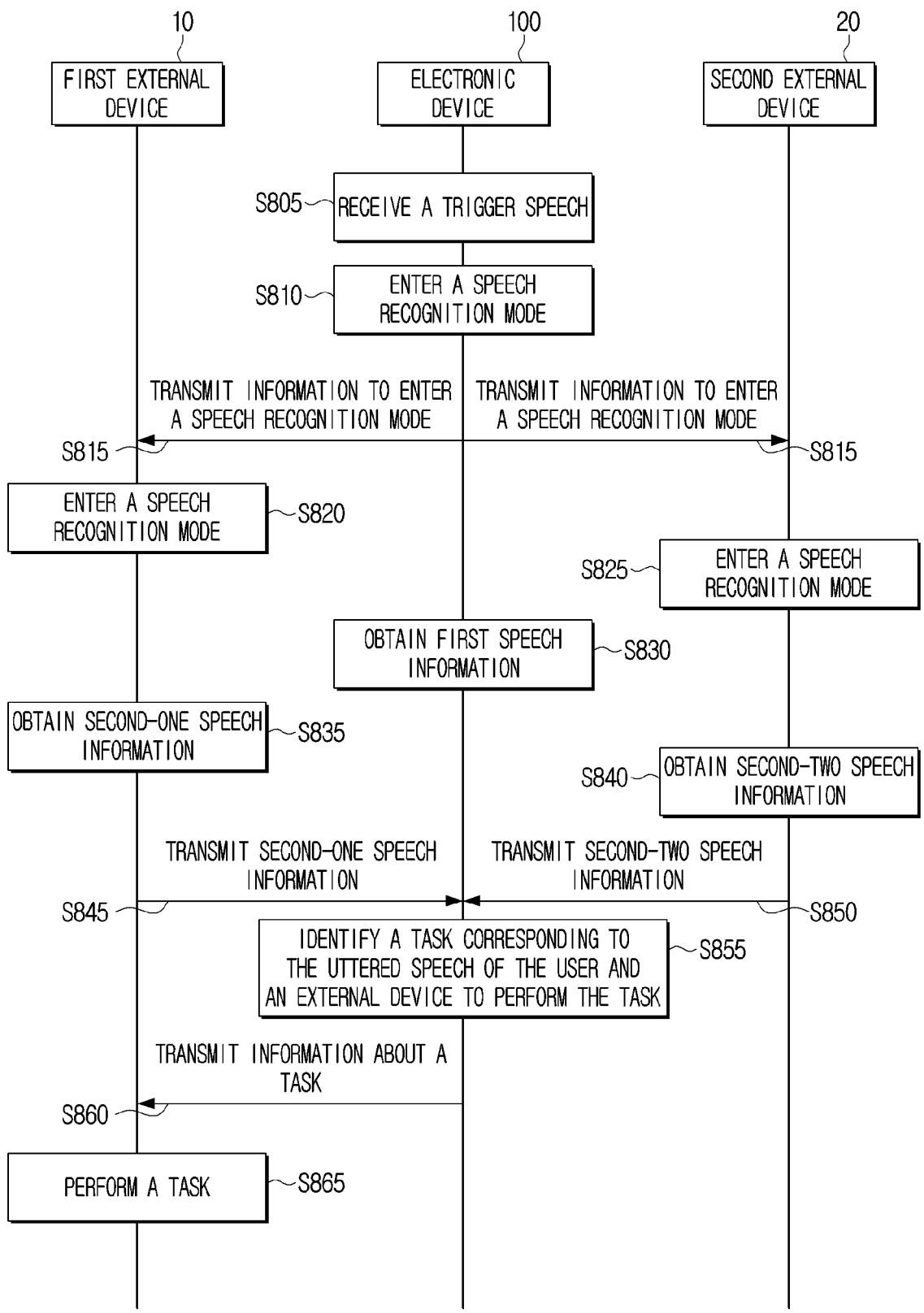
FIG. 8 illustrates a sequence diagram illustrating a task between an electronic device and a plurality of external devices according to an embodiment.

FIG. 8 illustrates a sequence diagram illustrating a task between an electronic device and a plurality of external devices according to an embodiment.

First, referring to FIG. 8, the electronic device 100 may receive a trigger speech in operation S805. In at least one embodiment, the trigger speech may include a trigger word, such as "Bixby", "Hi, Bixby", which is a speech.

When the trigger speech is received, the electronic device 100 may enter a speech recognition mode in operation S810. Specifically, the electronic device 100 may enter a speech recognition mode to activate the AI agent program. Further, when the trigger speech is received, the electronic device 100 may transmit information to enter the speech recognition mode into the first external device 10 and the second external device 20 in operation S815.

In operation S830, the electronic device 100 may obtain first speech information corresponding to the uttered speech of the user in operation S830. The first external device 10 receiving the information for entering the speech recognition mode from the electronic device 100 may enter the speech recognition mode in operation S820 and may obtain second-one speech information corresponding to the speech uttered by the user in operation S835. The second external device 20, which receives the information for entering the speech recognition mode from the electronic device 100, may enter the speech recognition mode in operation S825 and may obtain second-two speech information corresponding to the speech uttered by the user in operation S840.

The first external device 10 may transmit the second-one speech information to the electronic device 100 in operation S845, and the second external device 20 may transmit the second-two speech information to the electronic device 100 in operation S850. When the electronic device 100 receives the second-one speech information and the second-two speech information, the electronic device 100 can identify a task corresponding to the uttered speech of the user and an external device to perform the task in operation S855. Specifically, the electronic device 100 can identify a task corresponding to a user's uttered speech and an external device to perform the task based on the first speech information, the second-one speech information, and the second-two speech information.

If the external device to perform the task corresponding to the user's uttered speech is identified as being the first external device 10, the electronic device 100 may transmit information on the task corresponding to the user's uttered speech to the first external device 10 in operation S860. The first external device 10 may perform a task corresponding to the uttered speech of the user based on information on the task corresponding to the uttered speech of the user in operation S865.

The embodiment is not limited thereto, and if the external device to perform the task corresponding to the user's uttered speech is identified as being the second external device 20, the electronic device 100 may transmit information on the task corresponding to the user's uttered speech to the second external device 20. If the external device to perform the task corresponding to the user's uttered speech is identified as being the electronic device 100, the electronic device 100 may perform a task corresponding to the user's uttered speech.

FIG. 9 illustrates a sequence diagram illustrating a task between an electronic device and a plurality of external devices according to an embodiment.

First, referring to FIG. 9, the first external device 10 may receive a trigger speech in operation S905. When the trigger speech is received, the first external device 10 may enter the speech recognition mode in operation S910. Specifically, the first external device 10 may enter a speech recognition mode to activate the AI agent program. Further, when the trigger speech is received, the first external device 10 can transmit information for entering the speech recognition mode to the electronic device 100 and the second external device 20 in operation S915.

In operation S930, the first external device 10 may obtain the second-one speech information corresponding to the user's uttered speech while the first external device 10 operates in the speech recognition mode. The electronic device 100 receiving the information for entering the speech recognition mode from the first external device 10 may enter the speech recognition mode in operation S920 and obtain first speech information corresponding to the speech uttered by the user in operation S935. The second external device 20, which receives the information for entering the speech recognition mode from the first external device 10, may enter the speech recognition mode in operation S925 and may obtain second-two speech information corresponding to the speech uttered by the user in operation S940.

The first external device 10 may transmit the second-one speech information to the electronic device 100 in operation S945, and the second external device 20 may transmit the second-two speech information to the electronic device 100 in operation S950. When the electronic device 100 receives the second-one speech information and the second-two speech information, the electronic device 100 can identify the task corresponding to the user's uttered speech and an external device to perform the task in operation S955. Specifically, the electronic device 100 can identify a task corresponding to a user's uttered speech and an external device to perform the task and based on the first speech information, the second-one speech information, and the second-two speech information.

If the external device to perform the task corresponding to the user's uttered speech is identified as being the first external device 10, the electronic device 100 may transmit information on the task corresponding to the user's uttered speech to the first external device 10 in operation S960. The first external device 10 may perform a task corresponding to the uttered speech of the user based on information on the task corresponding to the uttered speech of the user in operation S965.

The embodiment is not limited thereto, and if the external device to perform a task corresponding to the user's uttered speech is identified as being the second external device 20, the electronic device 100 may transmit information on the task corresponding to the user's uttered speech to the second external device 20. If the external device to perform a task corresponding to the user's uttered speech is identified as being the electronic device 100, the electronic device 100 may perform a task corresponding to the user's uttered speech.

Embodiments of the disclosure have been described with reference to the accompanying drawings. However, this disclosure is not intended to limit the embodiments described herein but includes various modifications, equivalents, and/or alternatives. In the context of the description of the drawings, like reference numerals may be used for similar components.

In this document, the expressions "have," "may have," "including," or "may include" may be used to denote the presence of a feature (e.g., a component, such as a numerical value, a function, an operation, a part, or the like), and does not exclude the presence of additional features.

In this document, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

In addition, expressions "first", "second", or the like, used in the disclosure may indicate various components regardless of a sequence and/or importance of the components, will be used only in order to distinguish one component from the other components, and do not limit the corresponding components. For example, a first user device and a second user device may indicate different user devices regardless of a sequence or importance thereof. For example, the first component may be named the second component and the second component may also be similarly named the first component, without departing from the scope of the disclosure.

The term such as "module," "unit," "part", and so on may be used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor. The term user may refer to a person using an electronic device or a device using the electronic device (e.g., an artificial intelligence device).

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it can be understood that there is no other element (e.g., a third element) between the other elements.

Herein, the expression "configured to" can be used interchangeably with, for example, "suitable for," "having the capacity to," "designed to," "adapted to," "made to," or "capable of." The expression "configured to" does not necessarily mean "specifically designed to" in a hardware sense. Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processor (CPU) or application processor (AP)) that can perform the corresponding actions by executing one or more software programs stored in the memory device.

Terms used in the disclosure may be used to describe specific embodiments rather than restricting the scope of other embodiments. Singular forms are intended to include plural forms unless the context clearly indicates otherwise. Terms used in the disclosure including technical and scientific terms may have the same meanings as those that are generally understood by those skilled in the art to which the disclosure pertains. Terms defined in a general dictionary among terms used in the disclosure may be interpreted as meanings that are the same as or similar to meanings within a context of the related art, and are not interpreted as ideal or excessively formal meanings unless clearly defined in the disclosure. In some cases, terms may not be interpreted to exclude embodiments of the disclosure even where they may be defined in the disclosure.

The various example embodiments as described above may be implemented with software including instructions stored in the machine-readable storage media readable by a machine (e.g., a computer). A machine is a device which may call instructions from the storage medium and operate according to the called instructions, and may include an electronic device (example: electronic device 100) of the embodiments. When the instructions are executed by a processor, the processor may perform a function corresponding to the instructions directly or by using other components under the control of the processor. The instructions may include a code generated by a compiler or a code executable by an interpreter.

A machine-readable storage medium may be provided in the form of a non-transitory storage medium. Herein, the term "non-transitory" only denotes that a storage medium does not include a signal but is tangible, and does not distinguish the case in which a data is semi-permanently stored in a storage medium from the case in which a data is temporarily stored in a storage medium. For example, "non-transitory storage medium" may refer to a buffer temporarily storing data.

Each of the components (for example, a module or a program) according to the embodiments may be composed of one or a plurality of objects, and some subcomponents of the subcomponents described above may be omitted, or other subcomponents may be further included in the embodiments. Alternatively or additionally, some components (e.g., modules or programs) may be integrated into one entity to perform the same or similar functions performed by each respective component prior to integration. Operations performed by a module, program, or other component, in accordance with the embodiments of the disclosure, may be performed sequentially, in a parallel, repetitive, or heuristic manner, or at least some operations may be performed in a different order, omitted, or other operations can be added.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™) directly between two user devices (e.g., smartphones). In the case of on-line distribution, at least a portion of the computer program product may be stored temporarily or at least temporarily in a storage medium such as a manufacturer's server, a server of an application store, or a memory of a relay server.

While various example embodiments of the disclosure have been illustrated and described herein, it will be understood that the various example embodiments are intended to be illustrative, not limiting. One of ordinary skill in the art will understand that various changes in form and details may be made without departing from the true spirit and full scope of the disclosure as set forth, for example, in the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of controlling an electronic device, the method comprising:
   receiving a trigger speech of a user;
   in response to the trigger speech, entering a speech recognition mode to recognize a speech command of the user and transmitting information to at least one external device located at home for requesting the at least one external device to enter the speech recognition mode;
   obtaining a first speech information corresponding to a first speech uttered by the user from a microphone included in the electronic device while operating in the speech recognition mode;
   receiving, from the at least one external device operating in the speech recognition mode based on the transmitted information, at least one second speech information corresponding to the first speech uttered by the user;
   based on the first speech information and the at least one second speech information, identifying a task corresponding to the first speech uttered by the user and identifying an external device to perform the task from among the at least one external device; and transmitting, to the external device, information about the task.

2. The method of claim 1, wherein the identifying further comprises:

obtaining first text information corresponding to the first speech information and at least one second text information corresponding to at least one second speech information by inputting the first speech information and at least one second speech information to an automatic speech recognition (ASR) module; and obtaining final text information corresponding to the first speech uttered by the user based on the first text information and the at least one second text information.

3. The method of claim 2, wherein the obtaining the final text information comprises:

based on the first text information and the second text information being identical, identifying the first text information as the final text information, and based on the first text information and the second text information being different, obtaining final text information by inputting the first text information and the second text information to an artificial neural network model.

4. The method of claim 2, further comprising:

obtaining information about the task corresponding to the first speech uttered by the user by inputting the final text information to a natural language understanding (NLU) module.

5. The method of claim 2, wherein the final text information comprises at least one keyword, and wherein the identifying further comprises identifying the external device to perform the task corresponding to the first speech uttered by the user based on the at least one keyword.

6. The method of claim 3, wherein the final text information comprises a plurality of keywords corresponding to each of a syllable of the first speech uttered by the user, and wherein the identifying further comprises identifying the external device to perform the task corresponding to the first speech uttered by the user based on the plurality of keywords.

7. The method of claim 5, wherein the identifying the external device comprises identifying the external device to perform the task through a weight assigned to each of at least one keyword included in the final text information.

8. The method of claim 1, wherein the transmitting to the at least one external device comprises further transmitting information to cause a second electronic device, which is reproducing an image or audio, among the at least one external device receiving the information, to enter a mute mode.

9. The method of claim 1, wherein speech recognition engines included in the electronic device and the at least one external device are identical.

10. An electronic device, comprising:

a communication interface;

an input interface;

a memory storing at least one instruction; and a processor configured to control the electronic device by executing the at least one instruction stored in the memory, wherein the processor is further configured to:

receive a trigger speech of a user through the input interface, in response to the trigger speech, enter a speech recognition mode to recognize a user's speech command and control the communication interface to transmit information to at least one external device located at home for requesting the at least one external device to enter the speech recognition mode, obtain a first speech information corresponding to a first speech uttered by the user from a microphone included in the input interface while operating in a speech recognition mode;

receive, from the at least one external device operating in the speech recognition mode based on the transmitted information, at least one second speech information corresponding to the first speech uttered by the user;

based on the first speech information and the at least one second speech information, identify a task corresponding to the first speech uttered by the user and identify an external device to perform the task from among the at least one external device; and transmit, to the external device, information about the task through the communication interface.

11. The electronic device of claim 10, wherein the processor is further configured to:

obtain first text information corresponding to the first speech information and at least one second text information corresponding to at least one second speech information by inputting the first speech information and at least one second speech information to an automatic speech recognition (ASR) module, and obtain final text information corresponding to the first speech uttered by the user based on the first text information and the at least one second text information.

12. The electronic device of claim 11, wherein the processor is further configured to:

based on the first text information and the second text information being identical, identify the first text information as the final text information, and based on the first text information and the second text information being different, obtain final text information by inputting the first text information and the second text information to an artificial neural network model.

13. The electronic device of claim 11, wherein the processor is further configured to obtain information about a task corresponding to a speech uttered by the user by inputting the final text information to a natural language understanding (NLU) module.

14. The electronic device of claim 11, wherein the final text information comprises at least one keyword, and wherein the processor is further configured to identify the external device to perform the task corresponding to the first speech uttered by the user based on the at least one keyword.

15. The electronic device of claim 11, wherein the final text information comprises a plurality of keywords corresponding to each of a syllable of the first speech uttered by the user, and wherein the processor is further configured to identify the external device to perform the task corresponding to the first speech uttered by the user based on the plurality of keywords.

16. The electronic device of claim 14, wherein the processor is further configured to identify the external device to perform the task through a weight assigned to each of at least one keyword included in the final text information.

17. The electronic device of claim 10, wherein the processor is further configured to further transmit information to cause a second electronic device which is reproducing an image or audio, among the at least one external device receiving the information, to enter a mute mode.

18. The electronic device of claim 10, wherein speech recognition engines included in the electronic device and the at least one external device are identical.

19. A non-transitory computer readable medium comprising instructions, that when executed by a processor of an electronic device, cause the electronic device to:
   receive a trigger speech of a user through an input interface,
   in response to the trigger speech, enter a speech recognition mode to recognize a user's speech command and control a communication interface to transmit information to at least one external device located at home for requesting the at least one external device to enter the speech recognition mode,
   obtain a first speech information corresponding to a first speech uttered by the user from a microphone included in the input interface while operating in a speech recognition mode;
   receive, from the at least one external device operating in the speech recognition mode based on the transmitted information, at least one second speech information corresponding to the first speech uttered by the user;
   based on the first speech information and the at least one second speech information, identify a task corresponding to the first speech uttered by the user and identify an external device to perform the task based on the first speech information and the at least one second speech information; and
   transmit, to the external device, information about the task through the communication interface.

20. The non-transitory computer readable medium of claim 19, wherein the instructions
   obtain first text information corresponding to the first speech information and at least one second text information corresponding to at least one second speech information by inputting the first speech information and at least one second speech information to an automatic speech recognition (ASR) module, and
   obtain final text information corresponding to the first speech uttered by the user based on the first text information and the at least one second text information.

* * * * *